(12) United States Patent
Takeda et al.

(10) Patent No.: US 11,543,573 B2
(45) Date of Patent: Jan. 3, 2023

(54) POLARIZING PLATE AND OPTICAL APPARATUS CONTAINING SAME

(71) Applicant: DEXERIALS CORPORATION, Tokyo (JP)

(72) Inventors: Tomu Takeda, Tome (JP); Hideto Sagawa, Tome (JP)

(73) Assignee: DEXERIALS CORPORATION, Tochigi (JP)

( * ) Notice: Subject to any disclaimer, the term of this patent is extended or adjusted under 35 U.S.C. 154(b) by 330 days.

(21) Appl. No.: 16/686,950

(22) Filed: Nov. 18, 2019

(65) Prior Publication Data

US 2020/0158934 A1    May 21, 2020

(30) Foreign Application Priority Data

Nov. 20, 2018  (JP) .............................. JP2018-217093
Apr. 4, 2019   (JP) .............................. JP2019-072257

(51) Int. Cl.
  *G02B 5/30*     (2006.01)
  *G02F 1/1335*   (2006.01)

(52) U.S. Cl.
  CPC ......... *G02B 5/3058* (2013.01); *G02B 5/3008* (2013.01); *G02F 1/133528* (2013.01); *G02F 1/133548* (2021.01)

(58) Field of Classification Search
  CPC ............... G02B 5/3058; G02B 5/3008; G02F 1/133528; G02F 1/133548

USPC ........................................................ 359/485
See application file for complete search history.

(56) References Cited

U.S. PATENT DOCUMENTS

2013/0215507 A1 *  8/2013  Sasaki ..................... G02B 1/14
                                                      359/485.05
2020/0371277 A1 * 11/2020  Oowada ............... G02F 1/1335

FOREIGN PATENT DOCUMENTS

JP          5359128 B2    9/2008
JP          5184624 B2    1/2013

* cited by examiner

*Primary Examiner* — Nathanael R Briggs
*Assistant Examiner* — William D Peterson
(74) *Attorney, Agent, or Firm* — Schwegman Lundberg & Woessner, P.A.

(57) ABSTRACT

A polarizing plate has a wire grid structure, and includes a transparent substrate, and a plurality of protrusions, which extend in a first direction (y-direction) on the transparent substrate and are periodically spaced apart from each other at a pitch that is shorter than a wavelength of a light in a use band, wherein each of the protrusions has a base shape portion which is formed having a width across the cross-section orthogonal to the first direction (y-direction) that narrows toward the tip, and a protruding portion which protrudes from the base shape portion and absorbs light having a wavelength in the use band.

9 Claims, 6 Drawing Sheets

POLARIZING PLATE AND OPTICAL APPARATUS CONTAINING SAME

BACKGROUND OF THE INVENTION

Field of the Invention

The present invention relates to a polarizing plate and an optical apparatus containing the polarizing plate.

Priority is claimed on Japanese Patent Application No. 2018-217093, filed Nov. 20, 2018 and Japanese Patent Application No. 2019-072257, filed Apr. 4, 2019, the contents of which are incorporated herein by reference.

Description of Related Art

A polarizing plate is an optical element that absorbs light polarized in one direction and transmits light polarized in a direction orthogonal to that one direction. In principle, liquid crystal display devices require a polarizing plate. In particular, in liquid crystal display devices that use a light source having a large luminous energy, such as transmissive liquid crystal projectors, the polarizing plate is exposed to powerful radiation. Therefore, the polarizing plate requires excellent heat resistance and light resistance. The polarizing plate must be able to be formed in a size of about several cm, and also requires a high extinction ratio and an ability to control the reflectance characteristics. Wire grid inorganic polarizing plates have been proposed in response to these requirements.

A wire grid polarizing plate has a structure in which a multitude of conductive wires that extend in one direction are arranged on a substrate at a narrower pitch (several tens of nm to several hundred nm) than the wavelength of the light being used. When light is incident upon this polarizing plate, light that is polarized parallel to the direction of extension of the wires (TE waves (S-waves)) cannot pass through the polarizing plate, whereas light that is polarized in a direction perpendicular to the direction of extension of the wires (TM waves (P-waves)) can pass through the polarizing plate. Wire grid polarizing plates have excellent heat resistance and light resistance, can be made with a comparatively large size, and have a high extinction ratio. Furthermore, by forming the polarizing plate with a multilayer structure, the reflectance characteristics of the wire grid polarizing plate can also be controlled, and because image degradation caused by ghosting and the like, which occurs when return light that is reflected at the surface of the polarizing plate is reflected again inside the liquid crystal projector, can be reduced, such polarizing plates are suited to applications such as liquid crystal projectors.

Various polarizing plates have been proposed as examples of wire grid polarizing plates.

SUMMARY OF THE INVENTION

For example, Japanese Patent (Granted) Publication No. 5184624 discloses a polarizing plate that includes a wire grid layer comprising an array of elongated metal elements having a length that is longer than the wavelength of the incident light and a period that is shorter than half the wavelength of the incident light, is formed on a substrate.

Further, Japanese Patent (Granted) Publication No. 5359128 discloses a polarizing plate having a diffraction grating-shaped concave-convex portion on a substrate transparent to visible light and an inorganic fine particle layer a part of the convex portion.

However, although the grid structures of these polarizing plates are disclosed, no mention is made of the specific optical characteristics, and no mention is made regarding the grid shape required to obtain those optical characteristics. In recent years, as the brightness of liquid crystal projectors has increased, there has been a growing demand for polarizing plates that have a high transmittance, while being able to tolerate intense light environments. Accordingly, it is necessary to optimize the grid shape considering the material.

Further, in recent years, the light sources for illumination and displays have progressed from lamps to LEDs and then to lasers. Even in liquid crystal projectors, multiple semiconductor lasers (LD) are being used to achieve higher luminous flux and increased brightness. As a result, polarizing plates are now being demanded that have a high transmittance, while being able to tolerate intense light environments with high luminosity. Accordingly, it is necessary to optimize the grid shape considering the material.

The present invention has been developed in light of the above circumstances, and by optimizing the grid shape, has the objects of providing a polarizing plate having improved light transmittance characteristics in the transmission axis direction and an optical apparatus containing that polarizing plate.

In order to achieve the above objects, the present invention provides the aspects described below.

(1) A polarizing plate according to one aspect of the present invention is a polarizing plate having a wire grid structure, and includes a transparent substrate, and a plurality of protrusions, which in a first direction on the transparent substrate and are periodically spaced apart from each other at a pitch that is shorter than a wavelength of a light in a use band, wherein each of the protrusions has a base shape portion which is formed having a width across the cross-section orthogonal to the first direction that narrows toward the tip, and a protruding portion which protrudes from the base shape portion and absorbs light having a wavelength in the use band.

(2) In the aspect described in (1) above, the base shape portion may have a substantially triangular shape in the cross-section orthogonal to the first direction.

(3) In the aspect described in (2) above, in the base shape portion having a substantially triangular shape, when the height of the substantially triangular shape is termed a, and the width of the substantially triangular shape is termed b, a and b may satisfy $(a/b) > 1/2$.

(4) In the aspect described in (3) above, in the base shape portion having a substantially triangular shape, when the height of the substantially triangular shape is termed a, and the width of the substantially triangular shape is termed b, a and b may satisfy $13/10 \geq (a/b) \geq 7/10$.

(5) In the aspect described in any one of (1) to (4) above, the transparent substrate may be a laminated structure of a first substrate formed from a first material and a second substrate formed from a second material, wherein within the laminated structure, the first substrate is disposed on the base shape portion side, and the first material is the same as the material of the base shape portions.

(6) In the aspect described in (5) above, the second substrate may be formed from sapphire.

(7) In the aspect described in (5) or (6) above, a phase difference compensation element may be provided on the surface of the second substrate opposite to the surface on which the first substrate is disposed.

(8) In the aspect described in any one of (1) to (7) above, the protruding portion may be formed from a material selected from the group consisting of metals, alloys and semiconductors that absorbs light having a wavelength in the use band.

(9) In the aspect described in any one of (1) to (8) above, the surface of the polarizing plate on the protrusion side may be coated with a protective film made of a dielectric material.

(10) In the aspect described in any one of (1) to (9) above, the surface of the polarizing plate on the protrusion side may be coated with an organic water-repellent film.

(11) An optical apparatus according to another aspect of the present invention includes the polarizing plate of the aspect described in any one of (1) to (10) above.

The present invention is able to provide a polarizing plate having improved light transmittance characteristics in the transmission axis direction.

PREFERRED EMBODIMENTS

Embodiments of the present invention are described below in further detail with reference to the drawings. The drawings used in the following description may sometimes be drawn with specific portions enlarged to facilitate comprehension of the features of the present invention, and the dimensional ratios and the like between the constituent elements may differ from the actual values. The materials and dimensions and the like presented in the following description are merely examples, which in no way limit the present invention, and may be altered as appropriate within the scope of the present invention.

Polarizing Plate (First Embodiment)

Figure 1:
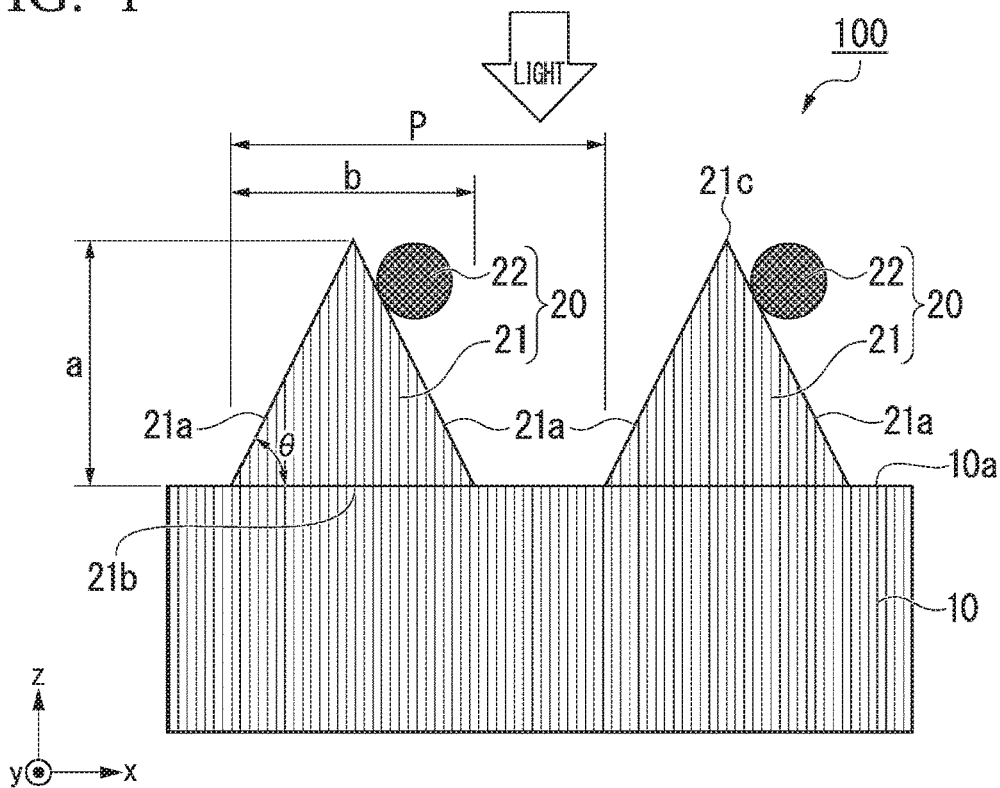
FIG. 1 is a cross-sectional schematic view of a polarizing plate according to a first embodiment of the present invention.

FIG. 1 is a cross-sectional schematic view of a polarizing plate according to a first embodiment of the present invention.

The polarizing plate 100 illustrated in FIG. 1 is a polarizing plate having a wire grid structure, and includes a transparent substrate 10, and a plurality of protrusions 20, which extend in a first direction (y-direction) on the transparent substrate 10 and are periodically spaced apart from each other at a pitch P that is shorter than a wavelength of a light in a use band, wherein each of the protrusions 20 has a base shape portion 21 which is formed having a width across the cross-section orthogonal to the first direction (y-direction) that narrows toward the tip, and a protruding portion 22 which protrudes from the base shape portion 21 and absorbs light having a wavelength in the use band.

The polarizing plate of the present invention may include a layer besides the transparent substrate and the protrusions, provided the effects of the present invention are achieved.

In the following description, as illustrated in FIG. 1, the plane across which a main surface 10a of the transparent substrate 10 extends is deemed the xy plane, the direction (first direction) along which the protrusions extend is deemed the y-direction, and the direction orthogonal to the y-direction, across which the protrusions are arrayed, is deemed the x-direction. Further, the direction orthogonal to the xy plane is deemed the z-direction. FIG. 1 illustrates an example in which the light incident upon the polarizing plate is incident from the z-direction of the transparent substrate side on which the protrusions are formed (the grid surface side), but the light incident upon the polarizing plate may also be incident from the transparent substrate side.

By utilizing the four effects of transmission, reflection, interference, and selective absorption of polarized light due to optical anisotropy, the polarizing plate having a wire grid structure attenuates polarized light waves having an electric field component parallel to the y-direction (TE waves (S-waves)) and transmits polarized light waves having an electric field component parallel to the x-direction (TM waves (P-waves)). Accordingly, in FIG. 1, the y-direction is the absorption axis direction for the polarizing plate, and the x-direction is the transmission axis direction for the polarizing plate.

Light that is incident upon the polarizing plate 100 illustrated in FIG. 1 from the side (the grid surface side) on which the protrusions 20 are formed is partially absorbed and attenuated upon passing the protruding portions 22. Of the light that passes the protruding portions 22. TM waves (P-waves) pass through the transparent substrate 10 with a high transmittance. On the other hand, of the light that passes the protruding portions 22, TE waves (S-waves) are reflected at the transparent substrate 10. TE waves that have been reflected at the transparent substrate 10 interfere when passing the protruding portions 22 and are attenuated. In this manner, by performing selective attenuation of the TE waves, the polarizing plate 100 is able to exhibit the desired polarization characteristics.

<Transparent Substrate>

There are no particular limitations on the transparent substrate 10, provided it is a substrate that has transparency relative to light of the wavelength in the use band for the polarizing plate 100, and the transparent substrate may be selected appropriately in accordance with the intended purpose. The expression "has transparency" need not necessarily mean that the substrate transmits 100% of the light of the wavelength in the use band, provided that sufficient light is transmitted to enable the functionality as a polarizing plate to be maintained. The average thickness of the transparent substrate 10 is preferably 0.3 mm or more and 1 mm or less. Examples of the light in the used light region include visible light having a wavelength of about 380 nm to 810 nm.

The constituent material of the transparent substrate 10 is preferably a material having a refractive index of 1.1 to 2.2, and specific examples include glass, rock crystal and sapphire. From the viewpoints of cost and transmittance, the use of glass, and particularly quartz glass (refractive index: 1.46) and soda lime glass (refractive index: 1.51), is preferred. There are no particular limitations on the composition of the glass material, and inexpensive glass materials such as silicate glass, which is widely used as optical glass, may also be used.

Further, from the viewpoint of the thermal conductivity, the use of rock crystal or sapphire having a high thermal conductivity as the transparent substrate 10 is preferred. This ensures that superior light resistance to intense light can be obtained, and means the transparent substrate can be used favorably for polarizing plate of the optical engine of a projector that generates a large amount of heat.

In those cases where a transparent substrate formed from an optically active crystal such as rock crystal is used, the protrusions are preferably arranged along a direction that extends parallel to or perpendicularly to the optical axis of the crystal. This ensures that excellent optical characteristics can be obtained. The optical axis is the axis in a direction for which the difference between the refractive index of an O ray (ordinary ray) of light and the refractive index of an E ray (extraordinary ray) of light travelling along that axial direction is smallest.

<Protrusions>

The protrusions 20 extend in the y-direction on the transparent substrate 10 and are arrayed periodically with spaces therebetween in the x-direction, at a pitch P that is shorter than the wavelength of the light in the use band.

Each of the protrusions 20 has a base shape portion 21 which is formed having a width across the xz cross-section orthogonal to the y-direction that narrows toward the tip, and a protruding portion 22 which protrudes from the base shape portion 21 and has absorption properties relative to the wavelength of the light in the use band.

There are no particular limitations on the pitch (the repeating interval in the x-direction) of the protrusions 20, which is indicated by reference sign P in FIG. 1, provided the pitch is shorter than the wavelength of the light in the use band. From the viewpoints of ease of manufacture and stability, the pitch of the protrusions is, for example, preferably from 100 nm to 200 nm. This pitch of the protrusions can be measured by observation of the protrusions using a scanning electron microscope or a transmission electron microscope. For example, a scanning electron microscope or a transmission electron microscope may be used to measure the pitch at four random locations, and the arithmetic mean of the four measured values then deemed the pitch. Hereafter, this measurement method is termed the electron microscope method.

(Base Shape Portion)

The base shape portion 21 is formed having a width across the xz cross-section orthogonal to the y-direction that narrows toward the tip. The manner in which the width across the xz cross-section narrows toward the tip may adopt various forms.

The base shape portion 21 may have a substantially triangular shape in the xz cross-section orthogonal to the y-direction.

The substantially triangular shape is preferably a substantially isosceles triangle (see FIG. 1).

Here, the expression "substantially triangular shape" does not necessarily refer to a strict triangular shape, and provided the effects of the present invention are retained, an approximate triangular shape may be used. For example, the substantially triangular shape may be a trapezoidal shape in which the tip of the triangle is missing.

Further, because the protrusions are extremely fine structures, the shape of the tapered portion may sometimes have a degree of rounding due to the manufacturing process, but such shapes are also included within the definition of the above substantially triangular shape.

Furthermore, the inclined surfaces (reference sign 21a in FIG. 1) of the substantially triangular shape of each protrusion may sometimes have some curvature, but such shapes are also included within the definition of the above substantially triangular shape.

The dimensions of the base shape portion 21 in the present description are described below using FIG. 1. The height of the base shape portion 21 is the dimension in the z-direction from a bottom surface 21b of the base shape portion 21 (the main surface 10a of the transparent substrate 10) to the tip 21c, and is indicated by the reference sign a in FIG. 1. Further, the width of the base shape portion 21 is the dimension in the x-direction across the xz cross-section of the bottom surface 21b of the base shape portion 21, and is indicated by the reference sign b in FIG. 1.

The height a of the base shape portion 21 may be set appropriately within a range from several tens of nm to several hundred nm. This height of the base shape portion 21 can be measured, for example, using the electron microscope method described above.

The height a of the base shape portion 21 is, for example, preferably within a range from 50 nm to 130 nm.

In terms of the relationship between the height a and the width b of the base shape portion 21, from the viewpoint of improving the transmittance, it is preferable that (a/b)>1/2, more preferable that $13/10 \geq (a/b) \geq 7/10$, and even more preferably that $13/10 \geq (a/b) \geq 9/10$.

The width b of the base shape portion 21 may be set appropriately within a range from several tens of nm to several hundred nm. The width of the base shape portion 21 can be measured, for example, using the electron microscope method described above.

The width b of the base shape portion 21 is, for example, preferably within a range from 80 nm to 120 nm.

In terms of the relationship between the width b and the height a of the base shape portion 21, from the viewpoint of improving the transmittance, it is preferable that (a/b)>1/2, more preferable that $13/10 \geq (a/b) \geq 7/10$, and even more preferably that $13/10 \geq (a/b) \geq 9/10$.

The base shape portions 21 may be formed from the same material as the transparent substrate 10.

The base shape portions 21 and the transparent substrate 10 may be formed as an integrated body, or the base shape portions 21 may be formed on top of the transparent substrate 10 using the same material as the transparent substrate 10. In the former case, the main surface of a transparent original plate (the substrate prior to performing the processing used to form the transparent substrate 10 is termed the "transparent original plate") is processed (for example, by selective etching) to form the base shape portions 21 on the main surface 10a of the transparent substrate 10.

The ratio between the width b of the base shape portion 21 and the region "P-b" in which no base shape portions 21 are formed preferably satisfies $6/1 \geq (b/P-b) \geq 4/3$.

The base shape portion 21 may also be formed from a dielectric material that is different from the transparent substrate 10.

In this case, the film thickness of the dielectric material (the height a of the base shape portion 21) may be set appropriately within a range from several tens of nm to several hundred nm. This film thickness of the dielectric material can be measured, for example, using the electron microscope method described above.

In terms of the relationship between the film thickness of the dielectric material (the height a of the base shape portion 21) and the width b, from the viewpoint of improving the transmittance, it is preferable that (a/b)>1/2, more preferable that 13/10≥(a/b)≥7/10, and even more preferably that 13/10≥(a/b)≥9/10.

Examples of the material of the dielectric material include typical materials including silicon oxides such as $SiO_2$, metal oxides such as $Al_2O_3$, beryllium oxide and bismuth oxide, magnesium fluoride such as $MgF_2$, cryolite, germanium, titanium dioxide, silicon, boron nitride, boron oxide, tantalum oxide and carbon, as well as combinations of two or more of these materials. Of these, the dielectric material is preferably composed of a silicon oxide.

The refractive index of the dielectric material is preferably greater than 1.0, but not more than 2.5. The optical characteristics of the protruding portions are affected by the surrounding refractive indices, and therefore the characteristics of the polarizing plate can be controlled by appropriate selection of the dielectric material.

The base shape portion 21 formed from a dielectric material can be formed as a high-density film using a method such as a vapor deposition method, sputtering method, CVD (Chemical Vapor Deposition) method, or ALD (Atomic Layer Deposition) method.

(Protruding Portion)

The protruding portion 22 protrudes from the base shape portion 21, and has absorption properties relative to the wavelength of the light in the use band. The expression "protrudes from the base shape portion 21", described using FIG. 1, means that the protruding portion 22 is formed so as to protrude from the inclined surface 21a or the tip (apex) 21c of the base shape portion 21.

The protruding portion 22 may have a microparticulate shape in the xz cross-section.

The protruding portion 22 may be arranged so as to extend along the y-direction which represents the absorption axis. In this case, the protruding portion 22 constitutes a wire grid structure and has functionality as a wire grid polarizer, attenuating polarized light waves having an electric field component parallel to the lengthwise direction of the protruding portion 22 (TE waves (S-waves)) and transmits polarized light waves having an electric field component orthogonal to the lengthwise direction of the protruding portion 22 (TM waves (P-waves)).

Examples of the constituent material of the protruding portion 22 include one or more substances such as metal materials and semiconductor materials that have an extinction coefficient among the optical constants that is not zero and have a light absorption action, and this constituent material may be selected appropriately in accordance with the wavelength range for the light being used. Examples of the metal materials include elemental simple substances such as Ta, Al, Ag, Cu, Au, Mo, Cr, Ti, W, Ni, Fe and Sn, and alloys containing one or more of these elements. Further, examples of the semiconductor materials include Si, Ge, Te, ZnO, and silicide materials (such as β-$FeSi_2$, $MgSi_2$, $NiSi_2$, $BaSi_2$, $CrSi_2$, $CoSi_2$ and TaSi). By using one of these materials, the polarizing plate is able to exhibit a high extinction ratio in the visible light band that is used.

In those cases where a semiconductor material is used as the constituent material of the protruding portion 22, because the band gap energy of the semiconductor material contributes to the light absorption action, the band gap energy must be no higher than the wavelength of the use band. For example, when visible light is used, a material having absorption at wavelengths of at least 400 nm, namely a band gap of not more than 3.1 eV, must be used.

In those cases where the protruding portion 22 has a substantially circular shape in the xz cross-section, the radius of that shape may be set appropriately within a range from several nm to several hundred nm. The radius of the protruding portion 22 can be measured, for example, using the electron microscope method described above.

The radius in the case of a protruding portion 22 having a substantially circular shape in the xz cross-section is, for example, preferably within a range from 5 nm to 100 nm.

The film thickness of the protruding portion 22 (the thickness with which the protruding portion 22 protrudes relative to the base shape portion 21) is not particularly limited, but for example, is preferably from 5 nm to 100 nm. This film thickness of the protruding portion 22 can be measured, for example, using the electron microscope method described above.

The position of the base shape portion 21 on the protruding portion 22 is not particularly limited, and either an inclined surface or the tip of the base shape portion 21 is possible.

The position of the base shape portion 21 on the protruding portion 22 is preferably within a range that represents the tip end 3/4 of the range from the tip of the base shape portion 21 to the bottom surface, and is more preferably within a range that represents the tip end 1/2 of the range from the tip of the base shape portion 21 to the bottom surface. If the protruding portion 22 is positioned near the bottom surface of the base shape portion 21, then there is a possibility that the manufacturing process may result in the protruding portion 22 also being disposed on the main surface of the transparent substrate.

The protruding portion 22 may be formed by a conventional dry method such as a vapor deposition method or sputtering method. In such as case, by conducting the vapor deposition or sputtering from an inclined angle, the protruding portion 22 can be formed on one of the inclined surfaces of the base shape portion 21. Following formation of the protruding portion 22 on one of the inclined surfaces of the base shape portion 21, an additional protruding portion 22 may also be formed on the other inclined surface. In the former case, the protruding portion 22 is formed in an asymmetric position relative to the base shape portion 21 when viewed in plan view from the z-direction. In the latter case, the protruding portions 22 are formed in symmetric positions relative to the base shape portion 21 when viewed in plan view from the z-direction.

The protruding portion 22 may also be formed by a conventional wet method.

The protruding portion 22 may be composed of two or more layers of different constituent materials.

<Protective Film>

Furthermore, the light incident surface of the polarizing plate of the present embodiment may be covered with a protective film formed from a dielectric material, provided there is no effect on the changes in the optical characteristics.

<Water-Repellent Film>

Moreover, the light incident surface of the polarizing plate of the present embodiment may be coated with an organic water-repellent film. This organic water-repellent film is formed, for example, from a fluorine-based silane compound such as perfluorodecyltriethoxysilane (FDTS), and can be formed, for example, using a CVD method or ALD method mentioned above. This can improve the reliability such as the moisture resistance of the polarizing plate.

The polarizing plate of the present invention can be used, for example in liquid crystal projectors which continue to increase in brightness, as a pre-polarizing plate positioned at a stage prior to the emission-side polarizing plate. As a result, by dispersing the amount of light received by the emission-side polarizing plate, the thermal load on the emission-side polarizing plate can be reduced, and a high transmittance can be achieved.

Polarizing Plate (Second Embodiment)

Figure 2:
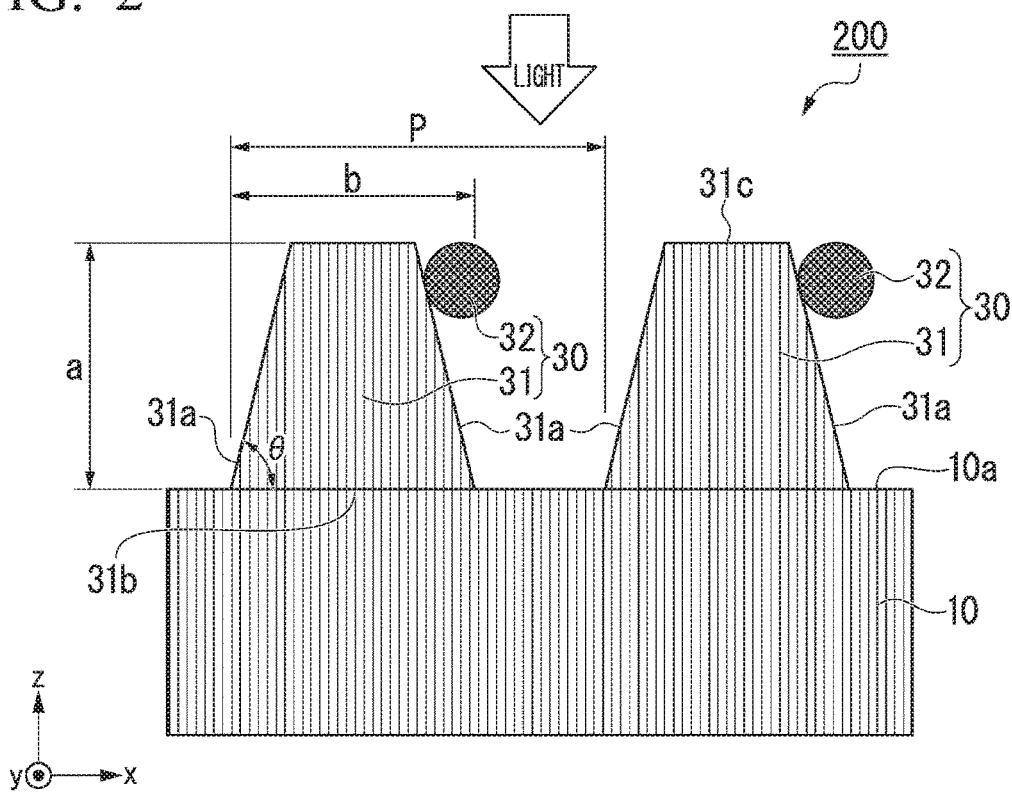
FIG. 2 is a cross-sectional schematic view of a polarizing plate according to a second embodiment of the present invention.

FIG. 2 is a cross-sectional schematic view of a polarizing plate according to a second embodiment of the present invention. In FIG. 2, components having the same reference sign as a component in FIG. 1 are deemed to represent the same component in FIG. 2, and description of these components is omitted. FIG. 2 illustrates an example in which the light incident upon the polarizing plate is irradiated along the z-direction from the side of the transparent substrate on which the protrusions are formed (the grid surface side), but the light incident upon the polarizing plate may also be irradiated from the side of the transparent substrate.

The polarizing plate 200 illustrated in FIG. 2 is a polarizing plate having a wire grid structure, and includes a transparent substrate 10, and a plurality of protrusions 30, which extend in a first direction (y-direction) on the transparent substrate 10 and are periodically spaced apart from each other at a pitch P that is shorter than the wavelength of the light in a use band, wherein each of the protrusions 30 has a base shape portion 31 which is formed having a width across the cross-section orthogonal to the first direction (y-direction) that narrows toward the tip, and a protruding portion 32 which protrudes from the base shape portion 31 and absorbs light having a wavelength in the use band.

Compared with the polarizing plate 100 illustrated in FIG. 1, the polarizing plate 200 illustrated in FIG. 2 has a different shape for the base shape portions. Specifically, whereas the base shape portion 21 illustrated in FIG. 1 has a substantially triangular shape in the xz cross-section, the base shape portion 31 illustrated in FIG. 2 has a trapezoidal shape in the xz cross-section.

The base shape portion 31 may have a substantially trapezoidal shape in the xz cross-section orthogonal to the y-direction. The substantially trapezoidal shape is preferably a shape in which the two inclined surfaces 31a that link an upper surface 31c and a lower surface (bottom surface) 31b have the same length, and the angles θ formed between the inclined surfaces 31a and the lower surface 31b are equal (see FIG. 2). This shape is a symmetrical trapezoid relative to an axis parallel to the z-direction.

Here, the expression "substantially trapezoidal shape" does not necessarily refer to a strict trapezoidal shape, and provided the effects of the present invention are retained, an approximate trapezoidal shape may be used.

Furthermore, because the protrusions are extremely fine structures, the shape of the tapered portion may sometimes have a degree of rounding due to the manufacturing process, but such shapes are also included within the definition of the above substantially trapezoidal shape.

Furthermore, the inclined surfaces (reference sign 31a in FIG. 2) of the substantially trapezoidal shape of each protrusion may sometimes have some curvature, but such shapes are also included within the definition of the above substantially trapezoidal shape.

The dimensions of the base shape portion 31 in the present description are described below using FIG. 2. The height of the base shape portion 31 is the dimension in the z-direction from the bottom surface 31b of the base shape portion 31 (the main surface 10a of the transparent substrate 10) to the upper surface 31c, and is indicated by the reference sign a in FIG. 2. Further, the width of the base shape portion 31 is the dimension in the x-direction across the xz cross-section of the bottom surface 31b of the base shape portion 31, and is indicated by the reference sign b in FIG. 2.

The shape and material of the base shape portion 31 may be the same as those described for the base shape portion 21.

Polarizing Plate (Third Embodiment)

Figure 8:
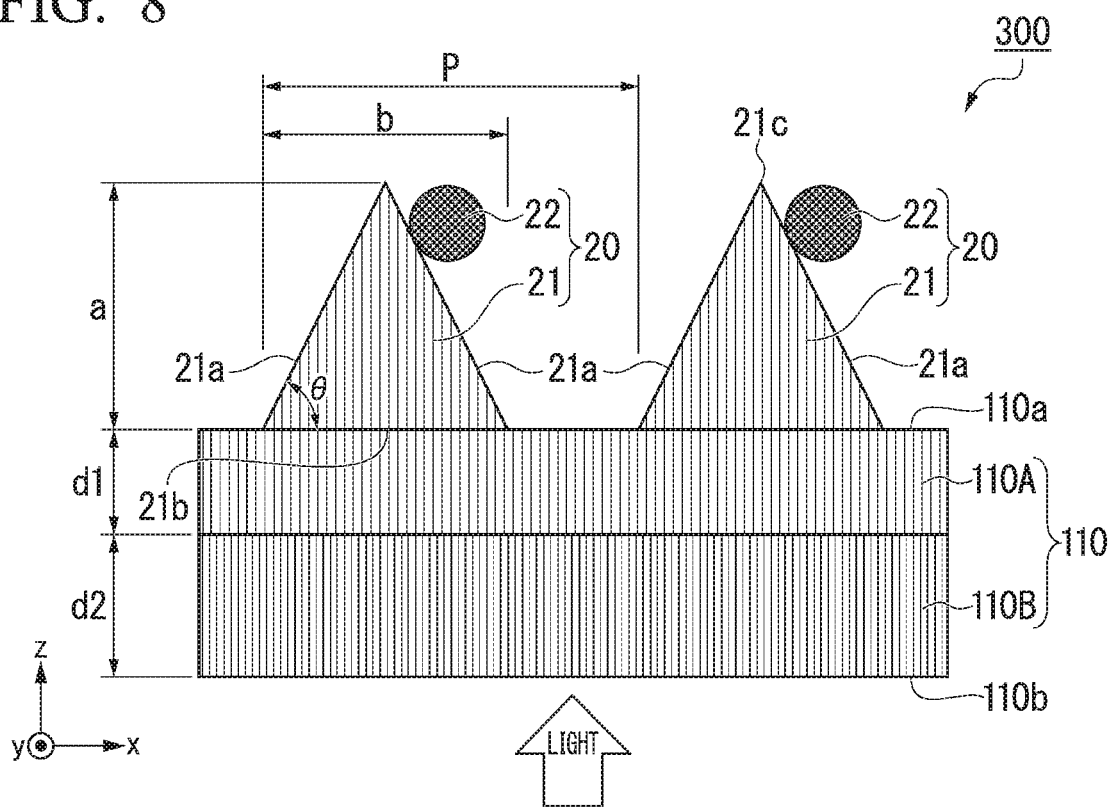
FIG. 8 is a cross-sectional schematic view of a polarizing plate according to a third embodiment of the present invention.

FIG. 8 is a cross-sectional schematic view of a polarizing plate according to a third embodiment of the present invention. Components having the same reference sign as one of the above embodiments are deemed to have the same structure, and description of these components is omitted. Further, even if the reference sign differs from the above embodiments, description of those components having the same functionality as above may sometimes also be omitted.

The polarizing plate 300 illustrated in FIG. 8 is a polarizing plate having a wire grid structure, and includes a transparent substrate 110, and a plurality of protrusions 20, which extend in a first direction (y-direction) on the transparent substrate 110 and are periodically spaced spaced apart from each other at a pitch P that is shorter than the wavelength of the light in a use band, wherein each of the protrusions 20 has a base shape portion 21 which is formed having a width across the cross-section orthogonal to the first direction (y-direction) that narrows toward the tip, and a protruding portion 22 which protrudes from the base shape portion 21 and absorbs light having a wavelength in the use band, the substrate 110 is a laminated structure of a first substrate 110A formed from a first material and a second substrate 110B formed from a second material, and within the laminated structure, the first substrate 110A is disposed on the side of the base shape portions 21, and the first material is the same as the material of the base shape portions 21.

The polarizing plate of the present embodiment may be used as a polarizing plate in which the light incident upon the polarizing plate is irradiated from the rear surface 110b side (the −z direction) of the transparent substrate 110, or may also be used as a polarizing plate in which the light is irradiated from the upper surface 110a side (the +z direction) of the transparent substrate 110.

<Transparent Substrate>

The transparent substrate 110 is a laminated structure of the first substrate 110A formed from a first material and the second substrate 110B formed from a second material The material of the second substrate 110B can use the same materials as those described above for the material of the transparent substrate 10.

The second substrate 110B is preferably a sapphire or rock crystal substrate.

This is because sapphire and rock crystal have high thermal conductivity (heat dissipation properties). Accordingly, by dissipating the heat from high-intensity light, superior light resistance can be obtained, meaning the polarizing plate can be used favorably as the polarizing plate for the optical engine of a projector that generates a large amount of heat. Examples of the light of the use band include visible light having wavelengths from about 380 nm to 810 nm. The average thickness of the sapphire substrate or rock crystal substrate is, for example, preferably from 0.3 mm to 1.5 mm.

The material of the first substrate 110A may use a material that is different from the material of the second substrate 110B, and the same as the materials described above for the base shape portions 21.

<Protective Film>

Further, the light emission surface of the polarizing plate of the present embodiment may be covered with a protective film formed from a dielectric material in a similar manner to that described in the above embodiment, provided there is no effect on the changes in the optical characteristics.

<Water-Repellent Film>

Moreover, the light emission surface of the polarizing plate of the present embodiment may be coated with an organic water-repellent film in a similar manner to that described in the above embodiment.

<Phase Difference Compensation Layer>

Figure 9:
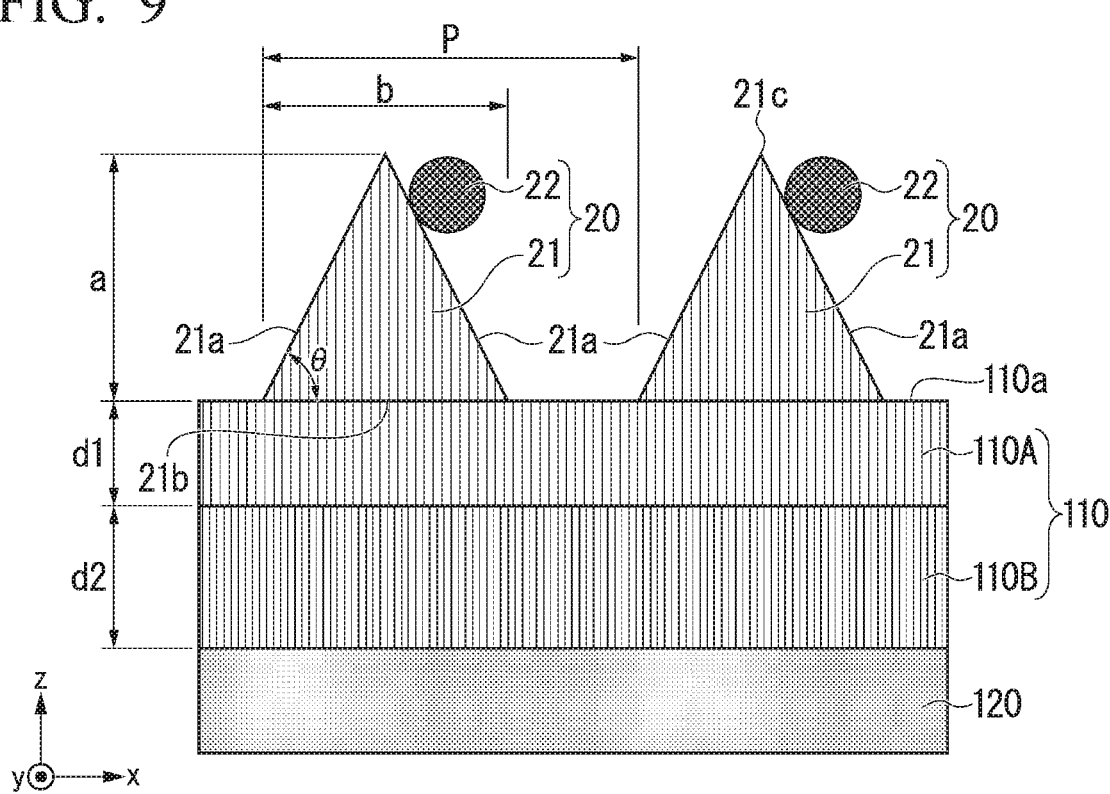
FIG. 9 is a cross-sectional schematic view of another example of the polarizing plate according to the third embodiment of the present invention.

Furthermore, as illustrated in FIG. 9, the polarizing plate of the present embodiment may have a phase difference compensation layer 120 formed on the light incident surface. The phase difference compensation layer is composed, for example, from a multilayer film that uses inorganic materials having optical anisotropy, and can be formed, for example, by using a vapor deposition method or sputtering method from an inclined angle. This enables compensation to be conducted for disturbance in the polarized light following passage through the liquid crystal panel.

Method for Manufacturing Polarizing Plates (of the First Embodiment and Second Embodiment)

One example of a method for manufacturing a polarizing plate of the first embodiment or the second embodiment of the present invention is described below. In those cases where a polarizing plate having a transparent substrate and base shape portions formed thereon is manufactured by processing the main surface of a transparent original plate, the method for manufacturing a polarizing plate according to the present invention includes an etching step of selectively etching the main surface of the transparent original plate to form protrusions which are arrayed on the transparent substrate at a pitch that is shorter than the wavelength of the light in the use band, and a step of forming a protrusion having absorption properties relative to the wavelength of the light in the use band on the base shape portion of each protrusion, and in the etching step, the protrusions are formed having a width across the cross-section orthogonal to the direction along which the protrusions extend that narrows toward the tip.

The base shape portions can be formed by a conventional method such as a photolithography method or a nanoimprinting method. Specifically, a one-dimensional lattice-shaped mask pattern is formed in a resist formed on the transparent original plate. The surface of the transparent substrate is then selectively etched in those regions where the mask pattern is not formed, thereby forming base shape portions that are arrayed on the transparent substrate at a pitch that is shorter than the wavelength of the light in the use band. Examples of the etching method include dry etching methods using an etching gas appropriate for the etching target material.

In particular, in the present invention, by optimizing the etching conditions (gas flow rate, gas pressure, output, and cooling temperature of the transparent substrate), the base shape portions can be formed with a tapered shape with inclined side surfaces that cause the width to narrow toward the tip.

The protrusions can be formed on the tapered shapes of those base shape portions, for example, by performing vapor deposition or sputtering from an inclined angle.

The above method enables manufacture of a polarizing plate of the structure illustrated in FIG. 1 and FIG. 2.

In those cases when a polarizing plate is manufactured in which base shape portions formed from a different material from the transparent substrate are formed on the main surface of the transparent substrate, the method for manufacturing a polarizing plate according to the present invention includes, instead of the etching step described above, a step of forming the base shape portions formed from a different material from the transparent substrate on the main surface of the transparent substrate.

The method for manufacturing a polarizing plate of the present invention may also include a step of coating the surface of the polarizing plate with a protective film formed from a dielectric material. Further, the method for manufacturing a polarizing plate of the present invention may also include a step of coating the surface of the polarizing plate with an organic water-repellent film.

Method for Manufacturing Polarizing Plate (of the Third Embodiment)

The method for manufacturing a polarizing plate of the third embodiment of the present invention describes mainly the steps that differ from the method for manufacturing a polarizing plate of the embodiments described above.

The second substrate (for example, a sapphire substrate) is prepared, and the material for the first substrate and the base shape portions (for example, $SiO_2$) is then deposited on the second substrate. Subsequently, the surface of the deposited material is subjected to selective etching, thereby leaving the portion that functions as the first substrate, while forming protrusions that are arrayed across the first substrate at a pitch that is shorter than the wavelength of the light in the use band. The reaming steps may be performed in the same manner as that described for the method for manufacturing a polarizing plate of the embodiments described above.

[Optical Apparatus]

An optical apparatus of the present invention contains a polarizing plate according to the present invention. In the optical apparatus of the present invention containing a polarizing plate according to the present invention, the light source may be a semiconductor laser.

The polarizing plate according to the present invention can be used for a variety of applications. Examples of optical apparatuses in which the polarizing plate may be used include liquid crystal displays and liquid crystal projectors, head-up displays, and digital cameras and the like.

In particular, because the polarizing plate according to the present invention is an inorganic polarizing plate having excellent heat resistance, the polarizing plate can be used particularly favorably in applications such as liquid crystal projectors and head-up displays and the like which require superior heat resistance to that provided by organic polarizing plates formed from organic materials.

Furthermore, the polarizing plate according to the present invention exhibits high transmittance and superior heat dissipation, and therefore increased brightness can be achieved with excellent heat resistance and high transmittance, even in intense light environments of high luminosity that employ multiple semiconductor lasers (LD). As a result, the polarizing plate can be used favorably in applications such as liquid crystal projectors. The polarizing plate according to the present invention is particularly ideal for use in high-brightness optical apparatuses (such as projectors) that use a semiconductor laser as the light source.

In those cases where an optical apparatus according to the present invention includes a plurality of polarizing plates, at least one of the plurality of polarizing plates is the polarizing plate according to the present invention. For example, in those cases where the optical apparatus according to the present invention is a liquid crystal projector, at least one of the polarizing plates disposed at the incident side and the emission side of the liquid crystal panel may be the polarizing plate according to the present invention.

Figure 11:
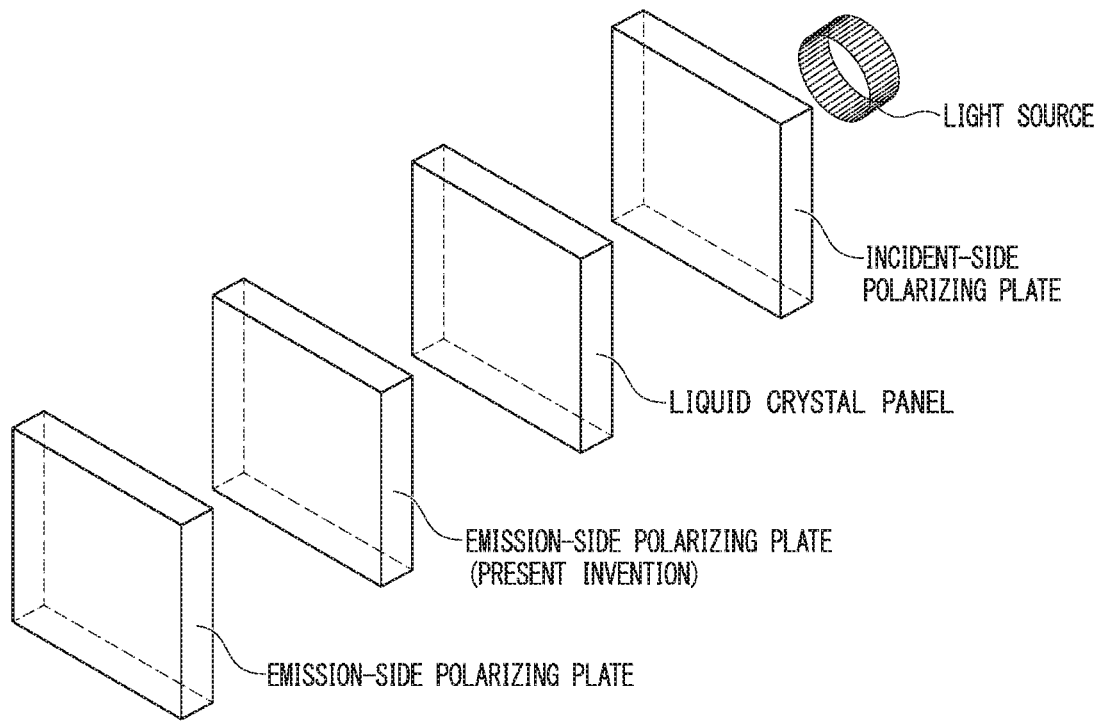
FIG. 11 is a perspective schematic view illustrating one example of an optical system that includes a polarizing plate according to an embodiment of the present invention.

As illustrated in FIG. 11, in the optical apparatus according to the present invention, by disposing the polarizing plate according to the present invention in a position immediately prior to the polarizing plate disposed at the emission side, the polarizing plate of the present invention is able to receive and dissipate the heat of a certain proportion of the high-intensity light received by the emission-side polarizing plate, thereby improving the resistance of the emission-side polarizing plate.

As illustrated in FIG. 11, the optical apparatus according to the present invention may include a light source, an incident-side polarizing plate, a liquid crystal optical element, an emission-side polarizing plate (the polarizing plate of the present invention), and another emission-side polarizing plate.

EXAMPLES

Examples of the present invention are described below, but the present invention is not limited to these examples.

Simulations were performed to investigate the effects of polarizing plates according to the present invention. The optical characteristics of these polarizing plates were investigated by electromagnetic field simulation conducted using RCWA (Rigorous Coupled Wave Analysis). A grating simulator GSolver, manufactured by Grating Solver Development Co., was used for the simulations.

Examples 1-1 to 1-4

The shape of the polarizing plate of Example 1-1 was as illustrated in FIG. 1, whereas the shapes of the polarizing plates of Examples 1-2 to 1-4 were as illustrated in FIG. 2.

In terms of the materials for the polarizing plates of Examples 1-1 to 1-4, the transparent substrate 10 and the base shape portions 21, 31 were formed from rock crystal, while the protruding portions 22, 32 were formed from Ge.

The shapes of the base shape portions 21, 31 of Examples 1-1 to 1-4 had a height a of 70 nm, a width b of 100 nm and a pitch P of 141 nm, and the inclination angle θ was 54°, 63°, 72° and 81°. Because the height a and the width b were fixed, Example 1-1 (θ=54°) had an xz cross-section that was a triangular shape, whereas Example 1-2 (θ=63°), Example 1-3 (θ=72°) and Example 1-4 (θ=81°) had xz cross-sections that had trapezoidal shapes. Further, the shapes of all the protruding portions 22, 32 in Examples 1-1 to 1-4 had a circular cross-section with a radius of 15 nm. As illustrated in FIGS. 1 and 2, the position of the protruding portion 22, 32 on each base shape portion 21, 31 was such that the outermost periphery of the circle reached the same height as the height a, and also contacted the inclined surface 21a, 31a.

Comparative Example 1

Figure 3:
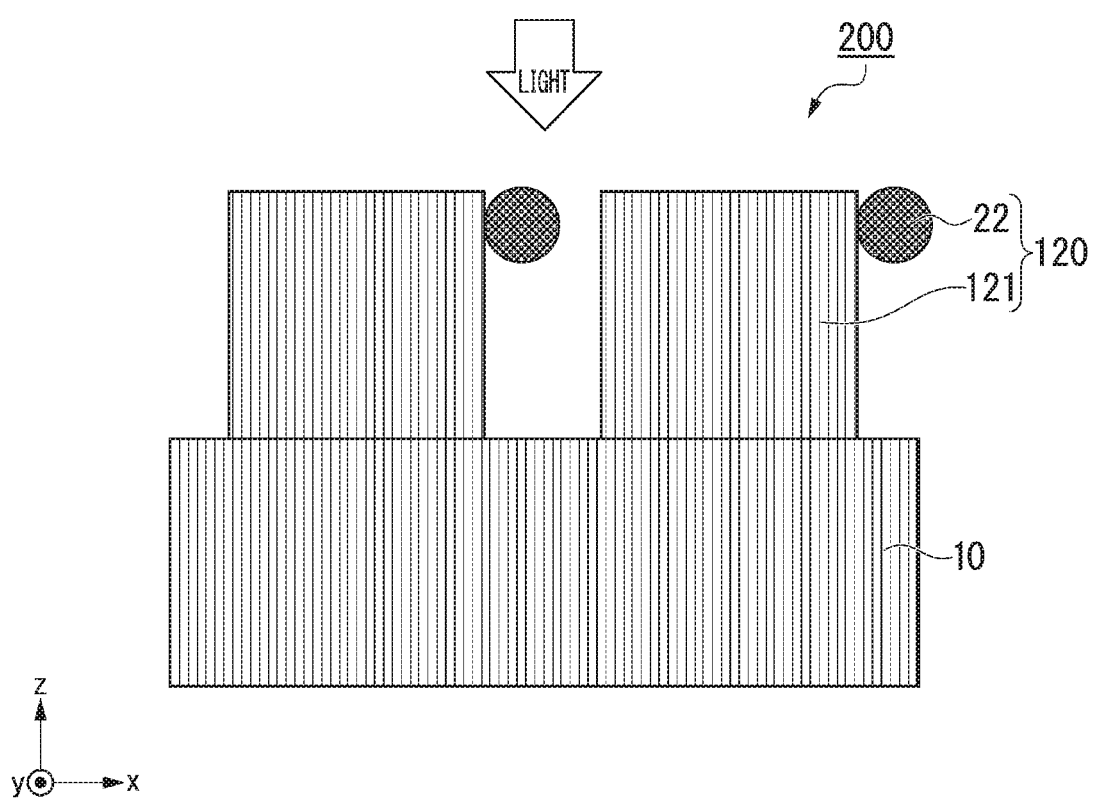
FIG. 3 is a cross-sectional schematic view of a polarizing plate of Comparative Example 1.

The shape of the xz cross-section of the polarizing plate of Comparative Example 1 was as illustrated in FIG. 3.

In terms of the materials for the polarizing plate 200 of Comparative Example 1, forming the transparent substrate 10 and the base shape portions 121 from rock crystal and the protruding portions 22 from Ge is the same as Examples 1-1 to 1-4, but the fact that the xz cross-section is rectangular differs from Examples 1-1 to 1-4.

The shape of the base shape portions 121 of Comparative Example 1 had a height a of 70 nm, a width b of 100 nm and a pitch P of 141 nm, and the inclination angle θ was 90°. Further, the shape of the protruding portions 22 in Comparative Example 1 had a circular cross-section with a radius of 15 nm. As illustrated in FIG. 3, the position of the protruding portion 22 on each base shape portion 121 was such that the outermost periphery of the circle reached the same height as the height a, and also contacted the side surface.

Figure 4:
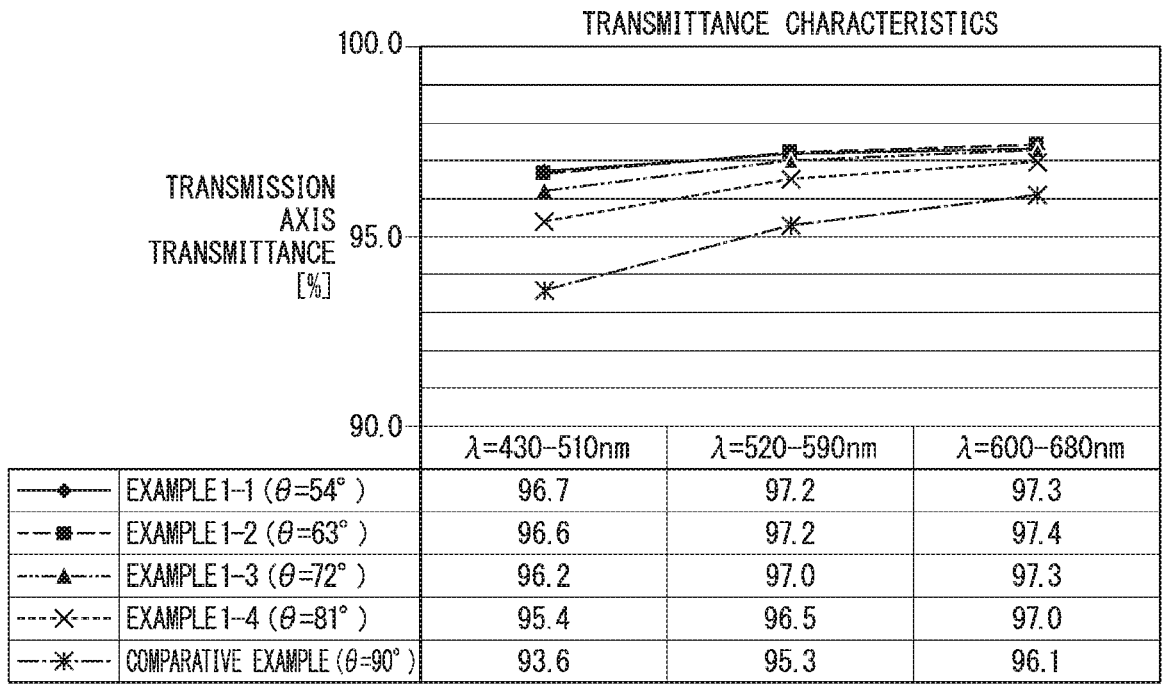
FIG. 4 is a graph illustrating the average values for the transmission axis transmittance of various wavelength bands for polarizing plates of Examples 1-1 to 1-4 and Comparative Example 1.

FIG. 4 is a graph illustrating the average values for the transmission axis transmittance of various wavelength bands for the polarizing plates of Examples 1-1 to 1-4 and Comparative Example 1. The horizontal axis indicates the wavelength λ (nm), and the vertical axis indicates the transmission axis transmittance Tp (%). Here, the transmission axis transmittance Tp means the transmittance of light polarized in the transmission axis direction (X-direction) (TM waves) that is incident upon the polarizing plate.

As illustrated in FIG. 4, by reducing the size of the inclination angle θ, the polarizing plates according to the present invention all exhibited improved transmission axis transmittance compared to the polarizing plate of Comparative Example 1 for all light in the visible light region (red region: wavelength λ=600 to 680 nm, green region: wavelength λ=520 to 590 nm, blue region: wavelength λ=430 to 510 nm).

It was evident that when the height a and the width b were the same, the base shape portions having a tapered shape yielded superior optical characteristics to base shape portions having a rectangular shape. Further, when the height a and the width b were the same, it was evident that an xz cross-section having a triangular shape yielded superior optical characteristics to an xz-cross-section having a trapezoidal shape. Further, when the height a and the width b were the same, and the xz cross-section was a trapezoidal shape, it was evident that a smaller inclination angle θ yielded superior optical characteristics.

Examples 2-1 to 2-5

The shapes of the polarizing plates of Examples 2-1 to 2-5 were as illustrated in FIG. 1.

In terms of the materials for the polarizing plates of Examples 2-1 to 2-5, the transparent substrate 10 and the base shape portions 21 were formed from rock crystal, while the protruding portions 22 were formed from Ge.

The shapes of the polarizing plates of Examples 2-1 to 2-5 each had a width b of 100 nm and a pitch P of 141 nm, but the height a was, in order, 50 nm, 70 nm, 90 nm, 110 nm or 130 nm (resulting in an inclination angle θ of 45°, 540, 61°, 660 or 69° respectively). Further, the shapes of all the protruding portions 22 in Examples 2-1 to 2-4 had a circular cross-section with a radius of 15 nm. As illustrated in FIG. 1, the position of the protruding portion 22 on each base shape portion 21 was such that the outermost periphery of the circle reached the same height as the height a, and also contacted the inclined surface 21a.

Figure 5:
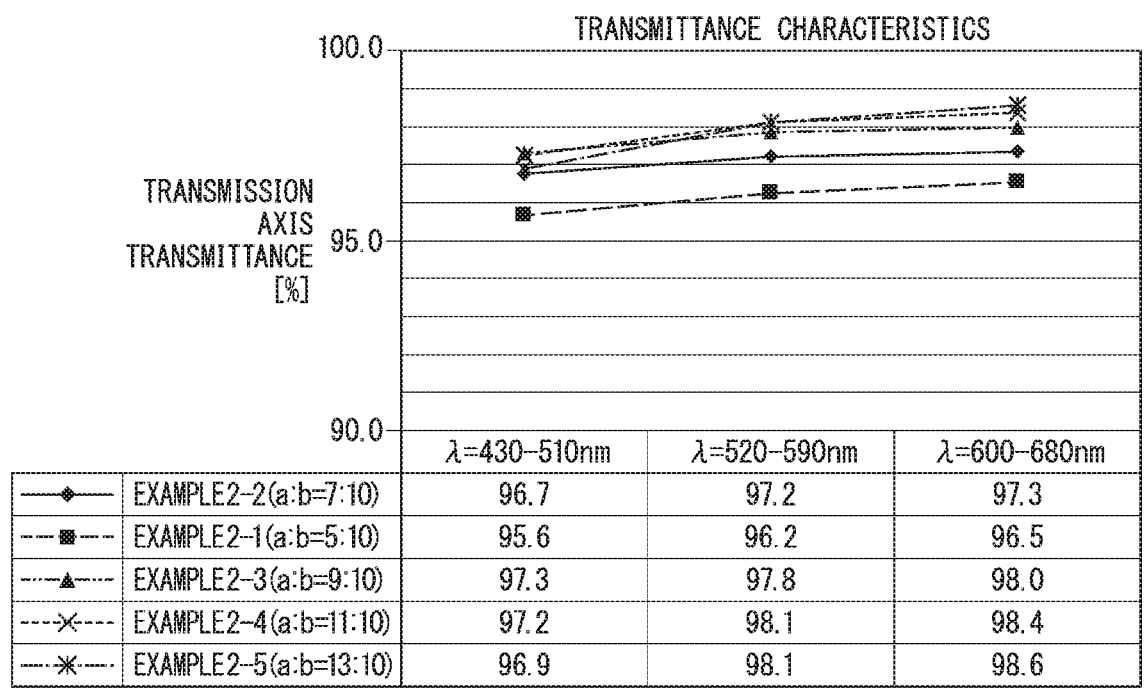
FIG. 5 is a graph illustrating the average values for the transmission axis transmittance of various wavelength bands for polarizing plates of Examples 2-1 to 2-5.

FIG. 5 is a graph illustrating the average values for the transmission axis transmittance of various wavelength bands for the polarizing plates of Examples 2-1 to 2-5. The horizontal axis indicates the wavelength λ(nm), and the vertical axis indicates the transmission axis transmittance Tp (%).

Based on FIG. 5, the ratio (a/b) of the height a relative to the width b preferably exceeds 1/2, and is more preferably at least 7/10, with those cases where a/b is 9/10, 11/10 and 13/10 being even more preferable to the case where a/b is 7/10.

Examples 3-1 to 3-5

The shapes of the polarizing plates of Examples 3-1 to 3-5 were as illustrated in FIG. 1.

In terms of the materials for the polarizing plates of Examples 3-1 to 3-5, the transparent substrate 10 and the base shape portions 21 were formed from sapphire, while the protruding portions 22 were formed from Ge.

The shapes of the polarizing plates of Examples 3-1 to 3-5 each had a width b of 100 nm and a pitch P of 141 nm, but the height a was, in order, 50 nm, 70 nm, 90 nm, 110 nm or 130 nm (resulting in an inclination angle θ of 45°, 54°, 61°, 66° or 69° respectively). Further, the shapes of all the protruding portions 22 in Examples 3-1 to 3-5 had a circular cross-section with a radius of 15 nm. As illustrated in FIG. 1, the position of the protruding portion 22 on each base shape portion 21 was such that the outermost periphery of the circle reached the same height as the height a, and also contacted the inclined surface 21a.

Figure 6:
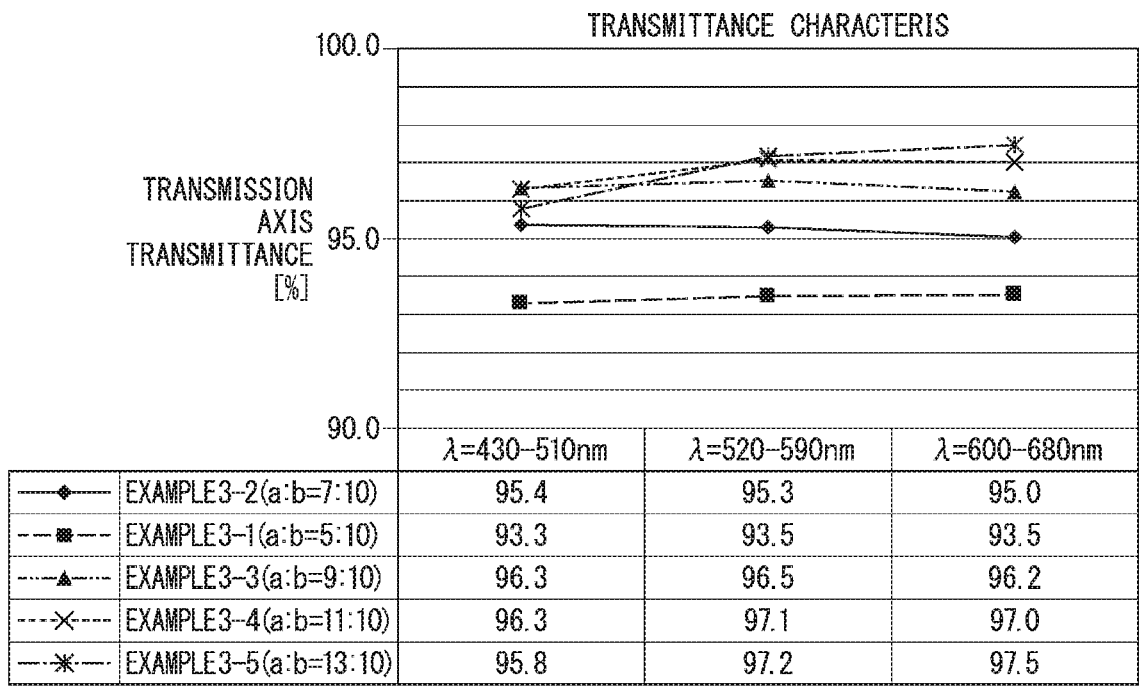
FIG. 6 is a graph illustrating the average values for the transmission axis transmittance of various wavelength bands for polarizing plates of Examples 3-1 to 3-5.

FIG. 6 is a graph illustrating the average values for the transmission axis transmittance of various wavelength bands for the polarizing plates of Examples 3-1 to 3-5. The horizontal axis indicates the wavelength λ(nm), and the vertical axis indicates the transmission axis transmittance Tp (%).

Based on FIG. 6, the ratio (a/b) of the height a relative to the width b preferably exceeds 1/2, and is more preferably at least 7/10, with those cases where a/b is 9/10, 11/10 and 13/10 being even more preferable to the case where a/b is 7/10. This result is the same as that for the polarizing plates of Examples 2-1 to 2-5, and it was evident that even if the material of the transparent substrate and the base shape portions was changed from rock crystal to sapphire, there was no change in the features of the polarizing plate.

Examples 4-1 to 4-5

The shapes of the polarizing plates of Examples 4-1 to 4-5 were as illustrated in FIG. 1.

In terms of the materials for the polarizing plates of Examples 4-1 to 4-5, the transparent substrate 10 was formed from sapphire, the base shape portions 21 were formed from $SiO_2$, and the protruding portions 22 were formed from Ge.

The shapes of the polarizing plates of Examples 4-1 to 4-5 each had a width b of 100 nm and a pitch P of 141 nm, but the height a was, in order, 50 nm, 70 nm, 90 nm, 110 nm or 130 nm (resulting in an inclination angle θ of 45°, 54°, 61°, 66° or 69° respectively). Further, the shapes of all the protruding portions 22 in Examples 4-1 to 4-5 had a circular cross-section with a radius of 15 nm. As illustrated in FIG. 1, the position of the protruding portion 22 on each base shape portion 21 was such that the outermost periphery of the circle reached the same height as the height a, and also contacted the inclined surface 21a.

Figure 7:
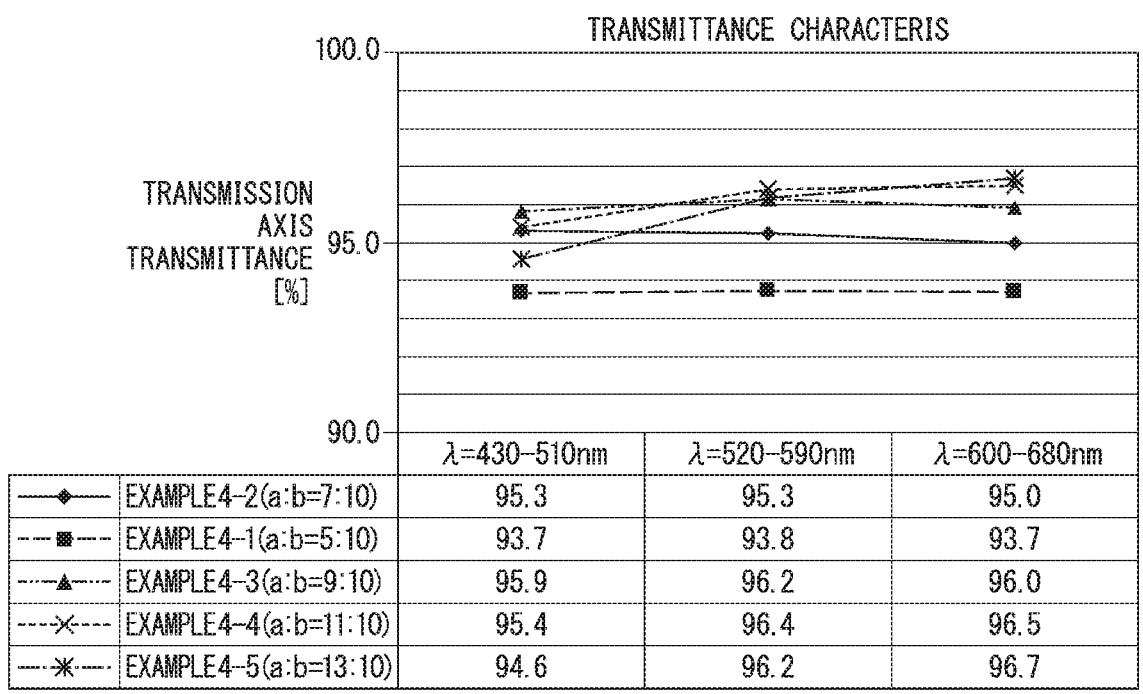
FIG. 7 is a graph illustrating the average values for the transmission axis transmittance of various wavelength bands for polarizing plates of Examples 4-1 to 4-5.

FIG. 7 is a graph illustrating the average values for the transmission axis transmittance of various wavelength bands for the polarizing plates of Examples 4-1 to 4-5. The horizontal axis indicates the wavelength λ(nm), and the vertical axis indicates the transmission axis transmittance Tp (%).

Based on FIG. 7, employing a shape in which the ratio (a/b) of the height a relative to the width b exceeds 1/2 yields improved transmission axis transmittance for the entire visible light region (red region: wavelength λ=600 to 680 nm, green region: wavelength λ=520 to 590 nm, blue region: wavelength λ=430 to 510 nm), and is consequently preferred.

Further, for the entire visible light region, employing a shape in which a/b is at least 7/10 yields improved transmission axis transmittance, and is therefore more preferred.

Furthermore, for the entire visible light region, structures having a shape in which a/b is 9/10 or 11/10 are even more preferred than a structure having a shape in which a/b is 7/10.

Moreover, in the green region (wavelength λ=520 to 590 nm) and the blue region (wavelength λ=430 to 510 nm), a structure having a shape in which a/b is 13/10 is even more preferred than a structure having a shape in which a/b is 7/10.

Examples 5-1 to 5-5

The shapes of the polarizing plates of Examples 5-1 to 5-3 were as illustrated in FIG. 8, wherein the first substrate 110A and the base shape portions 21 were formed from $SiO_2$, the second substrate 110B was formed from sapphire, and the protruding portions 22 were formed from Ge. Further, in the polarizing plates of Examples 5-1 to 5-3, the thickness d1 of the first substrate was 35 nm, 70 nm or 105 nm respectively, and the thickness d2 of the second substrate was 0.7 mm.

Further, the shape of the polarizing plate of Example 5-4 was as illustrated in FIG. 1, wherein the transparent substrate 10 was formed from sapphire, the base shape portions 21 were formed from $SiO_2$, and the protruding portions 22 were formed from Ge. The thickness of the transparent substrate 10 was 0.7 mm.

Furthermore, the shape of the polarizing plate of Example 5-5 was as illustrated in FIG. 1, wherein both the transparent substrate 10 and the base shape portions 21 were formed from sapphire, and the protruding portions 22 were formed from Ge. The thickness of the transparent substrate 10 was 0.7 mm.

Moreover, the shapes of all the protruding portions 22 in Examples 5-1 to 5-5 had a circular cross-section with a radius of 15 nm. As illustrated in FIG. 8 or FIG. 1, the position of the protruding portion 22 on each base shape portion 21 was such that the outermost periphery of the circle reached the same height as the height a, and also contacted the inclined surface 21a. Simulations were performed for the case where the incident light was irradiated from the direction illustrated in FIG. 8.

Figure 10:
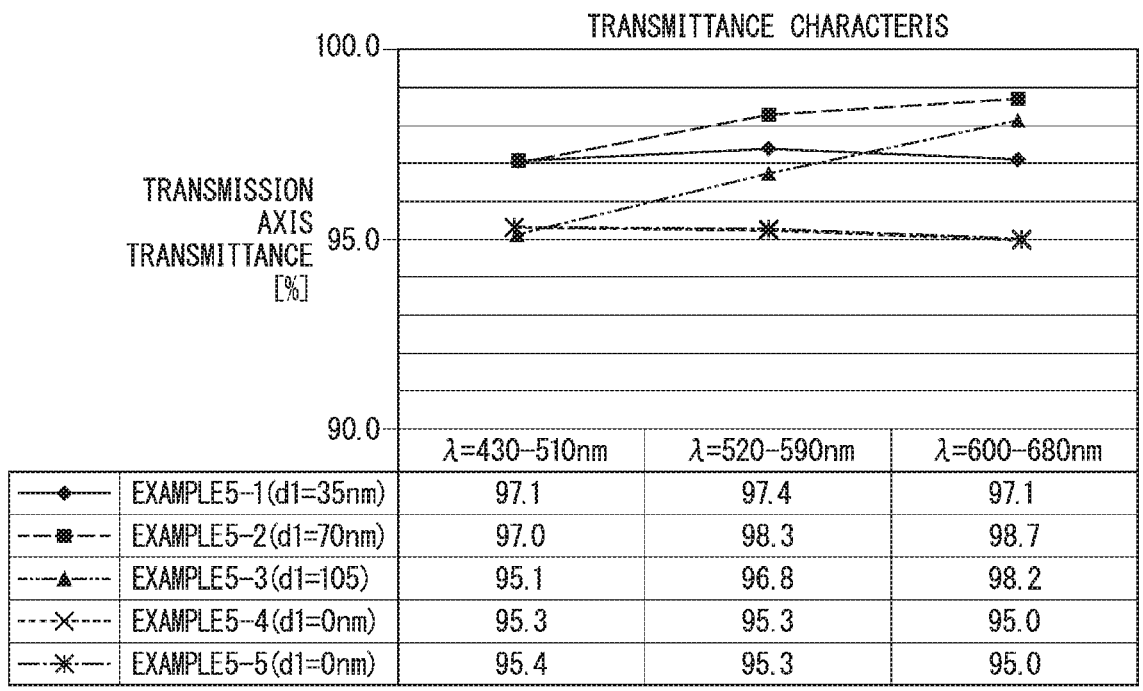
FIG. 10 is a graph illustrating the average values for the transmission axis transmittance of various wavelength bands for polarizing plates of Examples 5-1 to 5-5.

FIG. 10 is a graph illustrating the average values for the transmission axis transmittance of various wavelength bands for polarizing plates of Examples 5-1 to 5-5. The horizontal axis indicates the wavelength λ(nm), and the vertical axis indicates the transmission axis transmittance Tp (%).

Based on FIG. 10, the polarizing plates of Examples 5-1 and 5-2, in which the transparent substrate was a two-layer laminated structure in which the first substrate on the side of the base shape portions was formed from the same material as the base shape portions, exhibited improved transmission axis transmittance compared with the polarizing plates of Example 5-4 and Example 5-5 in which the transparent substrate was a single layer, for the entire visible light region (red region: wavelength λ=600 to 680 nm, green region: wavelength λ=520 to 590 nm, blue region: wavelength λ=430 to 510 nm). Further, the polarizing plate of Example 5-3 also exhibited improved transmission axis transmittance compared with the polarizing plates of Example 5-4 and Example 5-5 in which the transparent substrate was a single layer in the green region and the blue region.

Accordingly, from the viewpoint of improving the transmission axis transmittance, it is preferable to use a transparent substrate composed of a two-layer laminated structure, in which the first substrate on the side of the base shape portions is formed from the same material as the base shape portions.

DESCRIPTION OF THE REFERENCE SIGNS

10: Transparent substrate
10a: Main surface
20: Protrusion
21: Base shape portion
22: Protruding portion
30: Protrusion
31: Base shape portion
32: Protruding portion
100, 200, 300: Polarizing plate
110: Transparent substrate
110A: First substrate
110B: Second substrate
121: Base shape portion

What is claimed is:

1. A polarizing element having a wire grid structure, the polarizing element comprising:
   a transparent substrate, and
   a plurality of protrusions which extend in a first direction on a protrusion side of the transparent substrate and are periodically spaced apart from each other at a pitch that is shorter than a wavelength of a light in a use band, wherein
   each of the protrusions has a base shape portion which is formed having a width across a cross-section orthogonal to the first direction that narrows toward a tip, and a protruding portion which protrudes from the base shape portion and absorbs light having a wavelength in the use band,
   wherein the transparent substrate is a laminated structure of a first substrate formed from a first material and a second substrate formed from a second material,
   within the laminated structure, the first substrate is disposed on the protrusion side, and
   the first material is the same as a material of the base shape portion.

2. The polarizing element according to claim 1, wherein the second substrate is formed from sapphire.

3. The polarizing element according to claim 1, wherein a phase difference compensation element is provided on the surface of the second substrate opposite to the surface on which the first substrate is disposed.

4. The polarizing element according to claim 1, wherein the base shape portion has a substantially triangular shape in the cross-section orthogonal to the first direction.

5. The polarizing element according to claim 4, wherein a height of the substantially triangular shape is termed a, and a width of the substantially triangular shape is termed b, a and b satisfy $(a/b) > 1/2$.

6. The polarizing element according to claim 5, wherein a and b satisfy $13/10 \geq (a/b) \geq 7/10$.

7. The polarizing element according to claim 1, wherein the protrusion portion is formed from a material selected from the group consisting of metals, alloys and semiconductors that exhibit absorption properties relative to a wavelength of a light in the use band.

8. The polarizing element according to claim 1, wherein a surface of the polarizing element on the protrusion side is coated with a protective film made of a dielectric material.

9. The polarizing element according to claim 1, wherein a surface of the polarizing element on the protrusion side is coated with an organic water-repellent film.

* * * * *